United States Patent
Ha

(10) Patent No.: US 12,177,412 B2
(45) Date of Patent: Dec. 24, 2024

(54) TILED DISPLAY DEVICE INCLUDING DISPLAY PANELS AND METHOD OF OPERATING THE SAME

(71) Applicant: SAMSUNG DISPLAY CO., LTD., Yongin-si (KR)

(72) Inventor: Young Sang Ha, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/406,686

(22) Filed: Jan. 8, 2024

(65) Prior Publication Data
US 2024/0333905 A1    Oct. 3, 2024

(30) Foreign Application Priority Data
Mar. 27, 2023 (KR) .................. 10-2023-0040030

(51) Int. Cl.
*G02F 1/1335* (2006.01)
*G02F 1/1333* (2006.01)
*H04N 13/305* (2018.01)

(52) U.S. Cl.
CPC ....... *H04N 13/305* (2018.05); *G02F 1/13336* (2013.01); *G02F 1/133526* (2013.01)

(58) Field of Classification Search
CPC .......... G02F 1/13336; G02F 1/133526; H04N 13/305
See application file for complete search history.

(56) References Cited

U.S. PATENT DOCUMENTS

| 10,317,687 | B2 | 6/2019 | Li et al. |
| 2016/0170222 | A1* | 6/2016 | Li .......................... G02B 3/0056 348/43 |
| 2021/0223569 | A1* | 7/2021 | Dong ................ G02F 1/133305 |

FOREIGN PATENT DOCUMENTS

| JP | 3544171 | 7/2004 |
| KR | 10-0849563 | 7/2008 |
| KR | 10-2016-0073291 | 6/2016 |
| KR | 10-1806538 | 12/2017 |
| KR | 10-1925459 | 12/2018 |
| KR | 10-2130138 | 7/2020 |

* cited by examiner

*Primary Examiner* — James A Dudek
(74) *Attorney, Agent, or Firm* — F. CHAU & ASSOCIATES, LLC

(57) ABSTRACT

A tiled display device includes tiled display panels arranged in a first direction and a second direction crossing the first direction. Each of the tiled display panels include a display unit outputting a portion of a divided image and a lens array disposed on the display unit to refract the divided image. The tiled display device further includes movement members, or adjusters, connected to respective ones of the tiled display panels, and a processor configured to control the movement members. The movement members independently move the tiled display panels in a third direction crossing the first and second directions, respectively.

19 Claims, 17 Drawing Sheets

FIG. 3
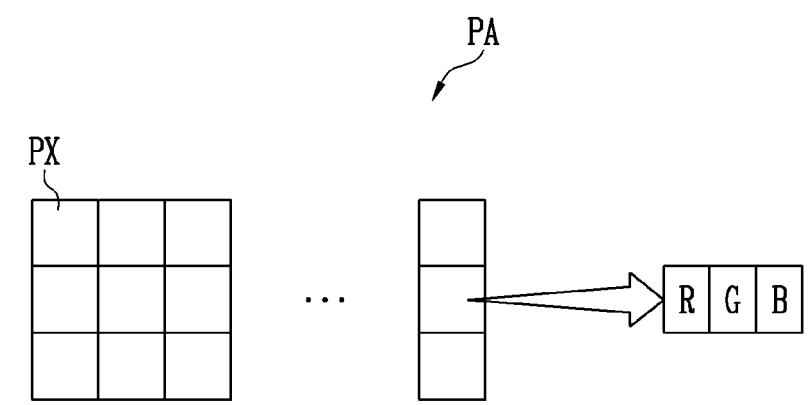
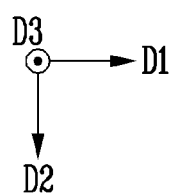

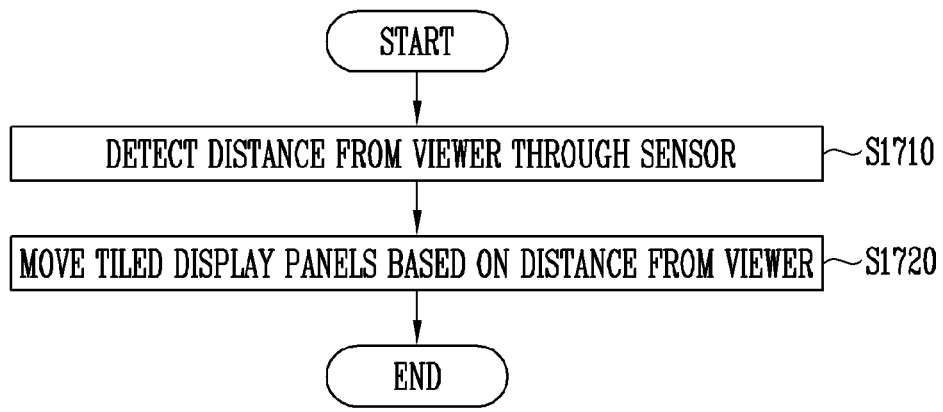
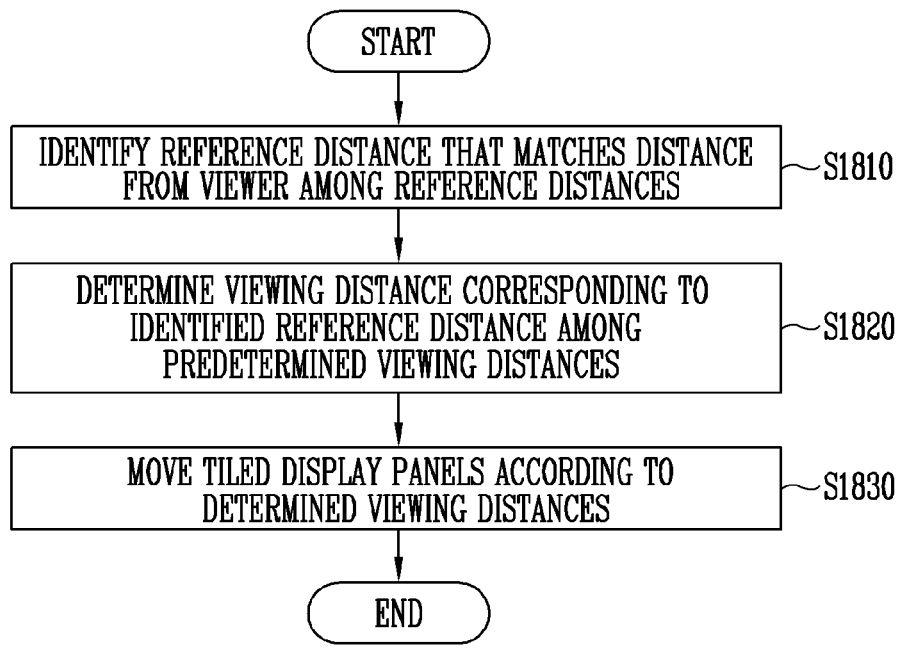

TILED DISPLAY DEVICE INCLUDING DISPLAY PANELS AND METHOD OF OPERATING THE SAME

This application claims priority to Korean Patent Application No. 10-2023-0040030, filed on Mar. 27, 2023, and all the benefits accruing therefrom under 35 U.S.C. § 119, the contents of which is herein incorporated by reference in its entirety.

BACKGROUND

1. Field

One or more embodiments described herein relate to a tiled display device including display panels and a method of operating the same.

2. Description of the Related Art

A variety of display devices have been developed. Examples include liquid crystal display devices (LCDs) and organic light emitting display devices (OLEDs).

A stereoscopic image display device allows a viewer to view a stereoscopic image that stimulates the visual sense of the viewer to perceive a real object. For example, a stereoscopic image display device may output a left eye image and a right eye image, to allow the viewer to perceive a three-dimensional image by binocular parallax between the left eye and the right eye.

Recently, research on a display device that provides a three-dimensional image without wearing glasses has been conducted. For example, a lenticular lens, configured to separate a left eye image and a right eye image from an output image using an array of cylindrical lenses, may be used.

A display device providing a three-dimensional image may provide the three-dimensional image by dividing and displaying several viewpoints. The separated viewpoints may be effectively transferred to the viewer when the viewer is positioned within a predetermined range. Thus, the viewer is able to perceive a three-dimensional image. For example, when the viewer is positioned within a certain viewing angle range and/or a certain viewing distance, a three-dimensional image may be transferred to the viewer as intended.

The content described above is only intended to help understanding of the background of the related art, and thus is not to be regarded as prior art.

SUMMARY

A tiled display device according to embodiments of the disclosure may provide an image having an improved three-dimensional effect to a viewer. For example, a tiled display device may include movement members capable of moving display panels. The movement members may be controlled so that a user views an output image of the display panels at a desired or optimal viewing distance. Accordingly, an image having an improved three-dimensional effect may be provided to the viewer without adjusting a three-dimensional image, for example, adjusting a depth of field or a viewing angle.

According to an embodiment of the disclosure, a tiled display device includes tiled display panels arranged in a first direction and a second direction crossing the first direction, each of the tiled display panels including a display outputting a divided image and a lens array disposed on the display to refract the divided image. Movement members (or position adjusters) are connected to the tiled display panels, and a processor is configured to control the movement members. The movement members independently move the tiled display panels in a third direction crossing the first and second directions, respectively.

The tiled display device may further include a sensor configured to detect a distance from a viewer. The processor may control the movement members to move the tiled display panels based on the distance from the viewer.

The tiled display device may further include a storage medium configured to store information indicative of predetermined viewing distances respectively corresponding to reference distances. The processor may identify a reference distance that matches the distance from the viewer among the reference distances, determine a viewing distance corresponding to the identified reference distance among the predetermined viewing distances, and control the movement members according to the determined viewing distance.

The tiled display device may further include a focus controller configured to adjust a depth of field of the divided image in the third direction. The storage medium may store information indicative of a target depth of field corresponding to the determined viewing distance, and the focus controller may control the depth of field of the divided image based on the stored target depth of field information.

The processor may be configured to generate a data signal so that the display of each of the tiled display panels outputs the divided image according to received image data, and the processor may be configured to detect an object included in the received image data and move the tiled display panels by controlling the movement members based on the detected object.

The movement members may be connected to respective ones of the tiled display panels. The movement members may include robot arms that move the tiled display panels.

Each of the robot arms may include support portions connected to one of the tiled display panels, and joint portions connected to the support portions to guide rotation of the support portions.

The joint portions may include motors that rotate the support portions. The joint portions may include a first joint portion guiding rotation based on a rotation axis parallel to the first direction, and a second joint portion guiding rotation based on a rotation axis parallel to the second direction.

The tiled display device may further include a motor driver configured to provide power to the motors.

Another aspect of the disclosure relates to a method of controlling a display device including tiled display panels. The tiled display panels are arranged in a first direction and a second direction crossing the first direction, and each of the tiled display panels includes a display configured to output a divided image and a lens array disposed on the display to refract the divided image. The method includes independently moving the tiled display panels in a third direction crossing the first and second directions, respectively, and displaying an image through the tiled display panels after the tiled display panels are moved. Independently moving the tiled display panels includes detecting a distance from a viewer through a sensor, and moving the tiled display panels based on the distance from the viewer.

The display device may further include a storage medium storing information indicative of predetermined viewing distances respectively corresponding to reference distances, and moving the tiled display panels based on the distance from the viewer may include identifying a reference distance that matches the distance from the viewer among the reference distances, determining a viewing distance corresponding to the identified reference distance among the predetermined viewing distances, and moving the tiled display panels according to the determined viewing distance.

The storage medium may store information indicative of a target depth of field corresponding to the determined viewing distance. Displaying the image through the tiled display panels may include adjusting a depth of field of the divided image based on the stored target depth of field.

Independently moving the tiled display panels may include detecting an object included in received image data, and moving the tiled display panels based on the detected object.

According to embodiments of the disclosure, a tiled display device providing an image having an improved three-dimensional effect to a viewer is provided.

In accordance with one or more embodiments, a method includes detecting a distance between a tiled display panel and a viewer; determining a viewing distance based on the distance between the tiled display panel and the viewer; and adjusting a position of the tiled display panel to correspond to the viewing distance, wherein the adjusted position of the tiled display panel generates a three-dimensional representation of at least a portion of an image displayed on the tiled display panel.

Adjusting the position of the tiled display panel may include moving the tiled display panel closer to a position of the viewer. Adjusting the position of the tiled display panel may include activating an adjuster provided for the tiled display panel.

The method may further include detecting an object in at least the portion of the image; and adjusting the position of the tiled display panel based on the detected object to improve the three-dimensional representation of the at lease the portion of the image.

The method may further include changing a depth of field of the tiled display panel to a target depth of field that corresponds to the distance between the tilted display panel and the viewer.

An effect according to embodiments is not limited by the content exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which:

FIG. 3 is a plan view illustrating an embodiment of a pixel array included in a display unit of FIG. 2;

FIG. 17 is a flowchart illustrating an embodiment of operation S1610 of FIG. 16;

FIG. 18 is a flowchart illustrating an embodiment of operation S1720 of FIG. 17;

DETAILED DESCRIPTION OF THE EMBODIMENT

Figure 1:
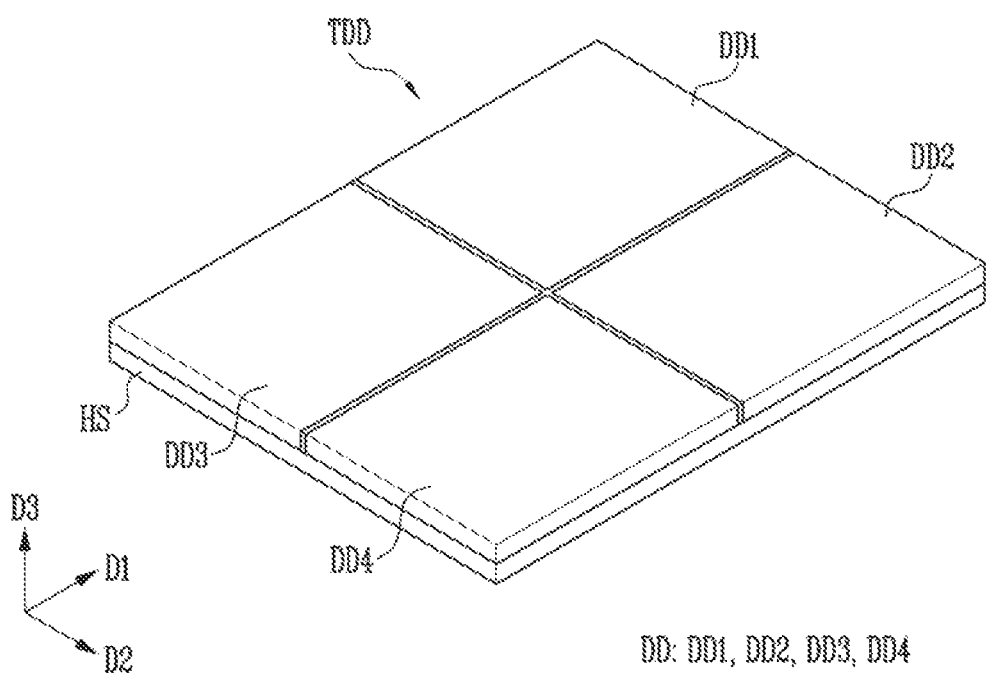
FIG. 1 is a perspective view illustrating an embodiment of a tiled display device.

Hereinafter, a preferred embodiment according to the disclosure is described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiment described herein. However, the embodiment described herein is provided to describe in detail enough to easily implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

Figure 2:
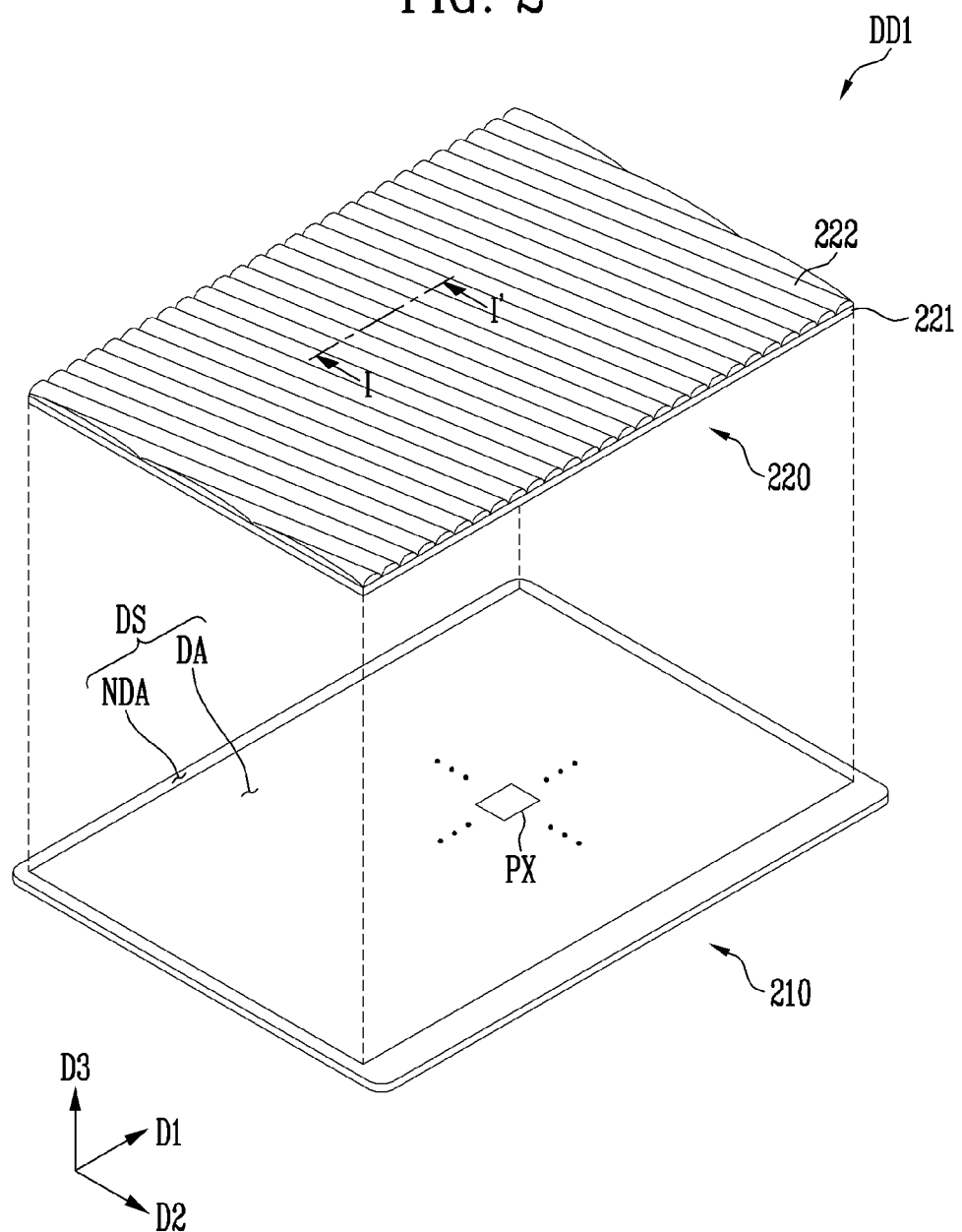
FIG. 2 is an exploded perspective view illustrating any one of tiled display panels of FIG. 1 according to an embodiment.

FIG. 1 is a perspective view illustrating an embodiment of a tiled display device. FIG. 2 is an exploded perspective view illustrating any one of tiled display panels included in the tiled display device of FIG. 1. FIG. 3 is a plan view illustrating an embodiment of a pixel array included in a display unit of the tiled display device of FIG. 2. In FIG. 2, a first tiled display panel DD1 among tiled display panels DD1 to DD4 of FIG. 1 is shown as an example.

Referring to FIG. 1, a tiled display device TDD according to an embodiment may include a plurality of tiled display panels (e.g., tiled display panels DD1 to DD4) to implement a multi-screen display device. In FIG. 1, four display panels are shown as an example, but the tiled display device TDD may include a different number of display panels in another embodiment.

The tiled display panels DD1 to DD4 may be included in any one of a variety of electronic devices. Examples include smart phones, televisions, tablet PCs, mobile phones, video phones, e-book readers, desktop PCs, laptop PCs, netbook computers, workstations, servers, personal digital assistants (PDAs), portable multimedia players (PMPs), MP3 players, medical devices, cameras, and wearable devices.

The tiled display panels DD1 to DD4 may be arranged along a first direction D1 and a second direction D2 crossing the first direction D1, adjacent to or overlapping a housing HS. For example, the first to fourth tiled display panels DD1 to DD4 may be arranged in a matrix form.

The first to fourth tiled display panels DD1 to DD4 may be arranged side-by-side so that display surfaces thereof face a third direction D3. The first to fourth tiled display panels DD1 to DD4 may have the same size (or area), but may have different sizes in another embodiment. For example, each of the first to fourth tiled display panels DD1 to DD4 may have a size (or area) different from the size of one or more other tiled display panels in order to achieve a desired design of the tiled display device TDD.

Each of the first to fourth tiled display panels DD1 to DD4 may be provided in various shapes. For example, each of the first to fourth tiled display panels DD1 to DD4 may have a rectangular plate shape, with two pairs of sides parallel to each other. When the first to fourth tiled display panels DD1 to DD4 have a rectangular plate shape, one pair of sides may be longer than the other pair of sides. In FIG. 1, for convenience of description, a case is illustrated where each of the first to fourth tiled display panels DD1 to DD4 has a rectangular shape, with one pair of long sides and one pair of short sides. An extension direction of the long side is indicated as the first direction D1, an extension direction of the short side is indicated as the second direction D2, and a direction perpendicular to the extension direction of the long side and the short side is indicated as the third direction D3. The display tile DD1 to DD4 may have a shape different from a rectangular plate shape in another embodiments.

The housing HS may physically combine the first to fourth tiled display panels DD1 to DD4, so that the first to fourth tiled display panels DD1 to DD4 configure one tiled display device TDD. The housing HS may be disposed on one surface (or a lower surface) of the first to fourth tiled display panels DD1 to DD4 to control or fix movement of the first to fourth tiled display panels DD1 to DD4. Each of the first to fourth tiled display panels DD1 to DD4 may be detachably combined to the housing HS through at least one combining member. Accordingly, since each of the first to fourth tiled display panels DD1 to DD4 may be easily attached or detached to or from the housing HS, when one of the first to fourth tiled display panels DD1 to DD4 is defective, it may be easily repaired or replaced.

Referring to FIG. 2, the first tiled display panel DD1 may include a display unit (or display) 210 and a lens unit (or lens arrangement) 220. The first tiled display panel DD1 may be a light field display system that outputs images through the lens unit 220 disposed on an upper surface of the display unit 210. This may allow the eyes of a viewer to see different images. The light field display system may create a stereoscopic image by generating a light field using the display unit 210 and the lens unit 220. Light rays generated from each pixel of the display unit 210 may form a light field directed to a specific viewing angle (or viewpoint) by lenses 222 of the lens unit 220. Thus, the viewer may perceive a stereoscopic image corresponding to the specific viewing angle.

In embodiments, the first tiled display panel DD1 may separately display a left eye image and a right eye image on a front surface of the first tiled display panel DD1, so that the viewer perceives a three-dimensional effect due to binocular parallax. Furthermore, the first tiled display panel DD1 may separate and provide images for a plurality of viewing angles to the front surface of the first tiled display panel DD1, so that different images are displayed at different respective viewing angles.

The display unit 210 may have a display surface DS extending in the first direction D1 and the second direction D2. The display surface DS may include a display area DA, which is an area where an image is output from the display unit 210, and a non-display area NDA partially or completely around the display area DA. The display unit 210 may include a pixel array configured of a plurality of pixels PX, each configured to emit light of any one color. The pixel array may be arranged in the display area DA.

Referring to FIG. 3, the pixel array PA may include a plurality of pixels PX arranged in the first and second directions D1 and D2. The pixels PX arranged along the first direction D1 among the plurality of pixels PX may form a pixel row. The pixels PX arranged along the second direction D2 among the plurality of pixels PX may form a pixel column. Each of the plurality of pixels PX may include a plurality of sub-pixels. For example, each of the plurality of pixels PX may include a first pixel R configured to emit red color light, a second pixel G configured to emit green color light, and a third pixel B configured to emit blue color light. The sub-pixels of each pixel PX may emit light of a different combination of colors in another embodiment.

Each of sub-pixels of the plurality of pixels PX may include a light emitting element and a pixel circuit configured to drive the light emitting element. In embodiments, the pixel circuit may include thin film transistors and at least one capacitor. It may be understood that the pixels PX shown in FIGS. 2 and 3 form an emission area where light from the light emitting elements is output.

In embodiments, each of the sub-pixels of the plurality of pixels PX may be connected to a scan line and a data line. Each of the sub-pixels of the plurality of pixels PX may receive a data voltage of the data line when a scan signal is applied from the scan line, and may emit light by supplying a driving current to the light emitting element according to the applied data voltage.

Referring to FIG. 2 again, the lens unit 220 may include a flat portion 221 and the lens array disposed on the flat portion 221. The lens array may include the lenses 222 arranged in the first direction D1. Each of the lenses 222 may have a predetermined width to overlap a predetermined number of pixels PX. Accordingly, light rays generated from each of the pixels PX may be output at a specific viewing angle by a corresponding lens among the lenses 222. As described above, the lenses 222 may refract light transferred from the display unit 210. In embodiments, the lenses 222 may include optically anisotropic material or an optically isotropic material.

The lenses 222 extend in a slanted direction by a predetermined acute angle with respect to the second direction D2. Because the lenses 222 are slanted with respect to the second direction D2 as described above, moiré patterns may be prevented from being visually recognized in the image output from the tile display panels DD1 to DD4. For example, a moiré pattern along the second direction D2 may be prevented.

In embodiments, the display unit 210 may be a light emitting display device. For example, the display unit 210 may include an organic light emitting display device, a quantum dot display device, a micro LED display device, and the like.

Figure 4:
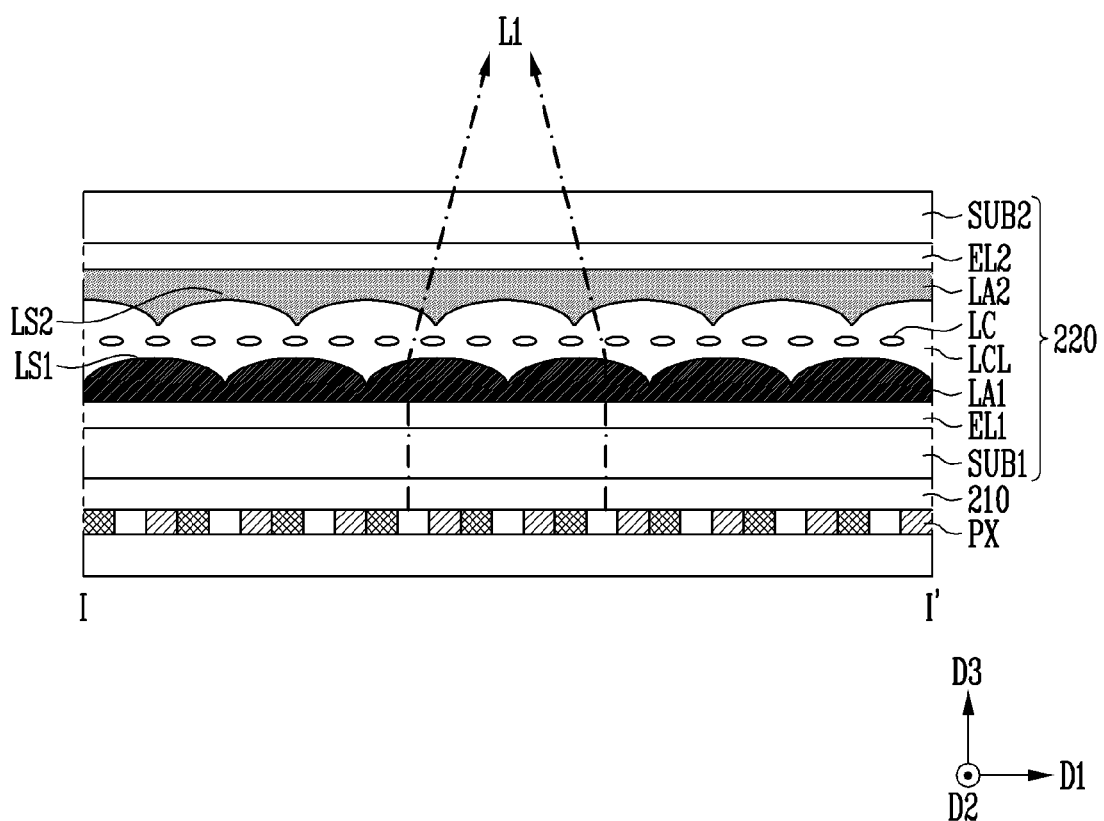
FIGS. 4 and 5 are cross-sectional views of an embodiment of a tiled display panel taken along a line I-I' of FIG. 2.
Figure 5:
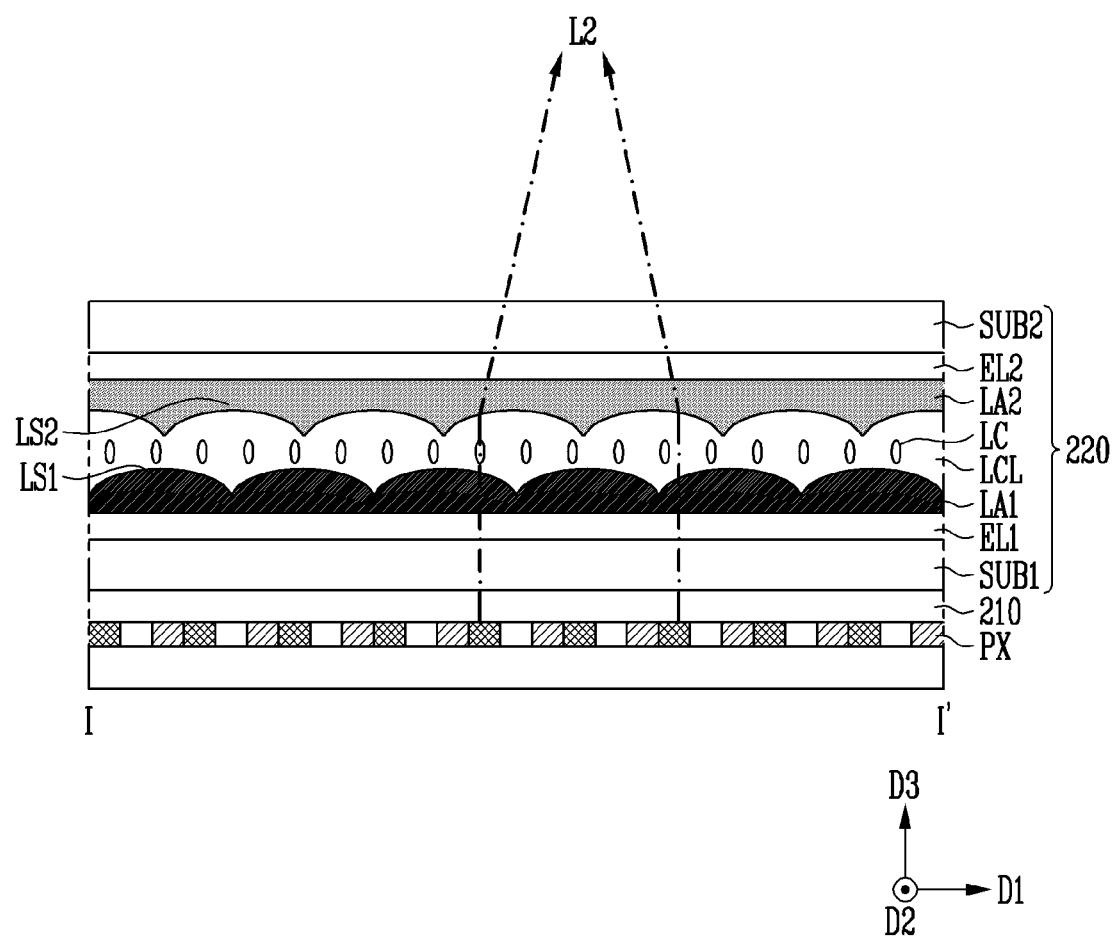

FIGS. 4 and 5 are cross-sectional views of an embodiment of a tiled display panel along a line I-I' of FIG. 2. In FIG. 4, liquid crystal molecules LC are shown in the case where an electric field is not formed between an upper electrode and a lower electrode of the lens unit 220. In FIG. 5, liquid crystal molecules LC are shown in the case where an electric field is formed between the upper electrode and the lower electrode of the lens unit 220.

First, referring to FIG. 4, the lens unit 220 may include a liquid crystal layer LCL to control refraction of light generated from the display unit 210. In embodiments, the lens unit 220 may include a lower substrate SUB1, a lower electrode layer EL1, a lower lens array LA1, the liquid crystal layer LCL, an upper lens array LA2, an upper electrode layer EL2, and an upper substrate SUB2.

Each of the lower substrate SUB1 and the upper substrate SUB2 may be formed of a transparent insulating material. Each of the lower substrate SUB1 and the upper substrate SUB2 may be formed of an organic material. As another example, each of the lower substrate SUB1 and the upper substrate SUB2 may be formed of an inorganic material.

The lower electrode layer EL1 may be disposed on the lower substrate SUB1. The lower electrode layer EL1 may have conductivity by including at least one of a metal material, a transparent conductive material, or various other conductive materials. The lower electrode layer EL1 may be formed as a single layer or multiple layers.

The lower lens array LA1 may be disposed on the lower electrode layer EL1. The lower lens array LA1 may include first lenses LS1 having convex shapes extending in the second direction D2 or in a direction inclined from the second direction D2. In embodiments, the first lenses LS1 may include an optically anisotropic material. Each of the first lenses LS1 may overlap a predetermined number of pixels PX, and may refract light L1 generated from the corresponding pixels PX.

The upper electrode layer EL2 may be disposed under the upper substrate SUB2. The upper electrode layer EL2 may have conductivity by including at least one of a metal material, a transparent conductive material, or various other conductive materials. The upper electrode layer EL2 may be formed as a single layer or multiple layers.

The upper lens array LA2 may be disposed under the upper electrode layer EL2. The upper lens array LA2 may include second lenses LS2 having concave shapes extending in the second direction D2 or in a direction inclined from the second direction D2. In embodiments, the second lenses LS2 may extend in substantially the same direction as the first lenses LS1. In embodiments, the first lenses LS1 may include an optically anisotropic material. Each of the second lenses LS2 may overlap the same number of pixels PX as each of the first lenses LS1, and may at least partially overlap two of the first lenses LS1. For example, each of the second lenses LS2 may have the same width as each of the first lenses LS1, and may be shifted in the first direction D1 and disposed when compared to each of the first lenses LS1. For example, each of the second lenses LS2 may have a central optical axis different from that of each of the first lenses LS1, and may be shifted in the first direction D1 by a predetermined (e.g., half a corresponding) width when disposed. Accordingly, the second lenses LS2 may refract the light L1 generated from the pixels PX differently from the first lenses LS1.

The liquid crystal layer LCL may be disposed between the lower lens array LA1 and the upper lens array LA2. The liquid crystal layer LCL may include liquid crystal molecules LC having an arrangement direction that corresponds to a lower layer (for example, the lower lens array LA1) and/or an upper layer (for example, the upper lens array LA2) that is in contact therewith.

When power is not applied to the lower electrode layer EL1 and the upper electrode layer EL2, an electric field may not be formed between the lower electrode layer EL1 and the upper electrode layer EL2. In this case, light L1 from the display unit 210 may be mainly refracted by the first lenses LS1 of the lower lens array LA1. For example, the light L1 may be refracted by the first lenses LS1 based on a difference between a refractive index of the lower lens array LA1 and a refractive index of the liquid crystal layer LCL. For example, the refractive index of the liquid crystal layer LCL may be different from that of the lower lens array LA1 due to the arrangement direction of the liquid crystal molecules LC.

When power is applied to the lower electrode layer EL1 and the upper electrode layer EL2, an electric field may be formed between the lower electrode layer EL1 and the upper electrode layer EL2. Referring to FIG. 5, when power is applied to the lower electrode layer EL1 and the upper electrode layer EL2, long axes of the liquid crystal molecules LC may be arranged along a corresponding electric field direction. In this case, light L2 from the display unit 210 may be mainly refracted by the second lenses LS2 of the upper lens array LA2. For example, since the long axes of the liquid crystal molecules LC are arranged along the electric field direction, a difference between the refractive index of the liquid crystal layer LCL and the refractive index of the lower lens array LA1 may be minimized or reduced, while a difference between the refractive index of the liquid crystal layer and a refractive index of the upper lens array LA2 may increase. Accordingly, the light L2 from the display unit 210 may be mainly refracted by the second lenses LS2 of the upper lens array LA2.

As described above, the lens unit 220 may control the liquid crystal layer LCL through the lower electrode layer EL1 and the upper electrode layer EL2, and thus may selectively perform refraction using the lower lens array LA1 and refraction using the upper lens array LA2. This allows for adjustment in the depth of field DOF of the light field (or image) output through the lens unit 220. For example, the light L2 refracted by the second lenses LS2 may direct a depth of field DOF different from that of the light L2 refracted by the first lenses LS1. For example, the light L2 refracted by the second lenses LS2 may direct a greater depth of field DOF from the first tiled display panel DD1 than the light L2 refracted by the first lenses LS1.

Figure 6:
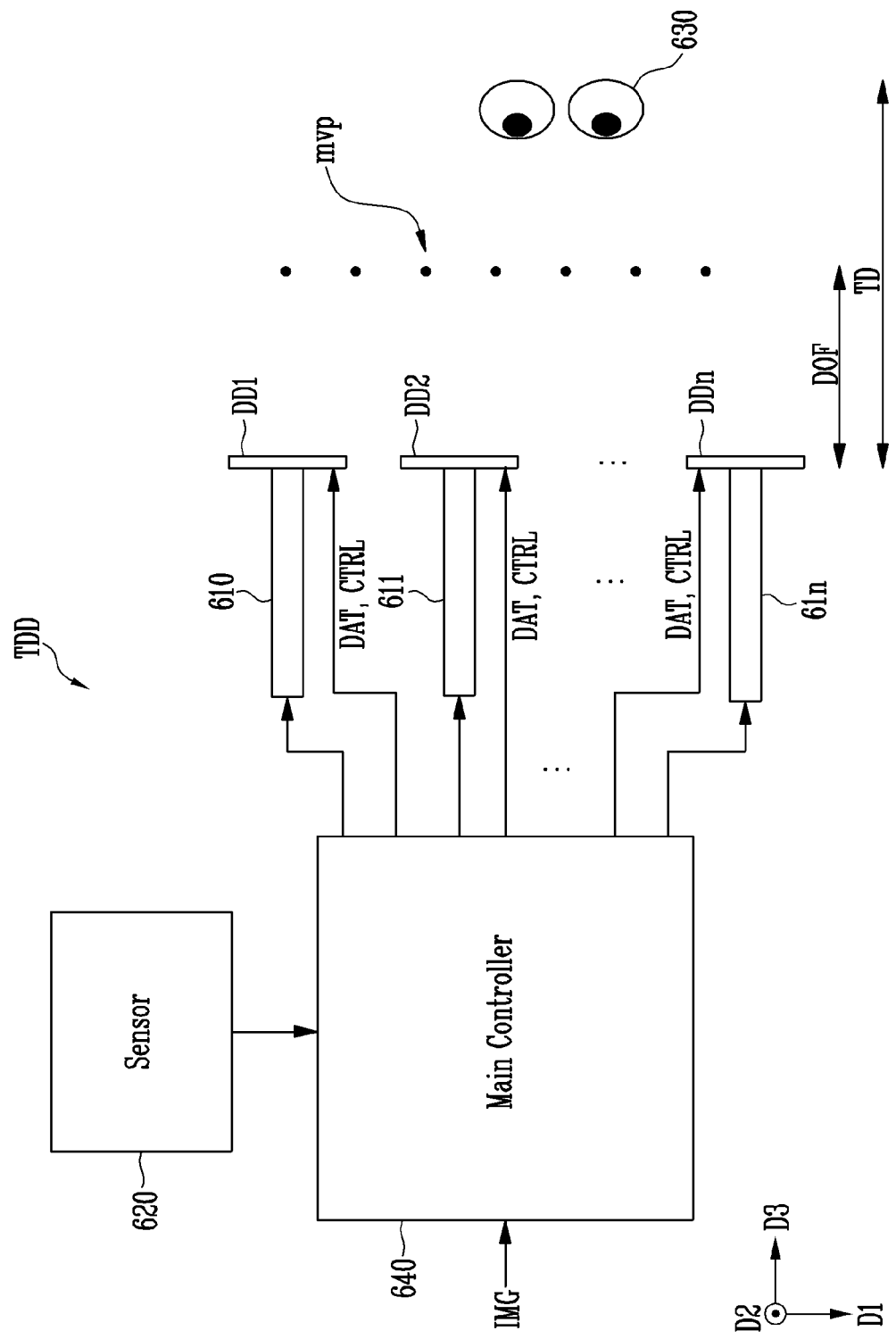
FIG. 6 is a side view of a tiled display device according to an embodiment of the disclosure.

FIG. 6 is a side view of the tiled display device TDD according to an embodiment of the disclosure.

Referring to FIG. 6, the tiled display device TDD may include tiled display panels DD1 to DDn (where n is an integer greater than 1), movement members 610 to 61n, a sensor 620, and a main controller 640.

The movement members (or adjusters) 610 to 61n operate in response to control of the main controller 640. The movement members 610 to 61n are fixed to, for example, the housing HS of FIG. 1 and are configured to independently move the tiled display panels DD1 to DDn in the third direction D3.

The sensor 620 may detect a distance TD from a viewer 630. The sensor 620 may detect a viewing height and a viewing position of the viewer 630. The sensor 620 may provide the detected distance TD from the viewer 630, viewing height, and viewing position to the main controller 640.

The viewer 630 may be spaced apart from the tiled display panels DD1 to DDn in the third direction D3 and positioned. The distance TD from the viewer include a horizontal distance between the viewer 630 and the tiled display panels DD1 to DDn in the third direction D3. The depth of field DOF may indicate a range in which a light field of viewpoints generated by the display unit 210 and the lens unit 220 is directed or formed. For example, the depth of field DOF may indicate a depth of a three-dimensional image corresponding to the light field in the third direction D3. Maximum viewpoints mvp of FIG. 6 indicate focuses (or points) farthest from the tiled display panels DD1 to DDn in the depth of field DOF.

The main controller 640 is configured to control the display unit 210. The main controller 640 may transmit a data signal DAT and a control signal CTRL to the display unit 210 so that the display unit 210 displays an image.

The main controller 640 is configured to receive image data IMG from a host or other external source and generate the data signal DAT based on the received image data IMG. In addition, the main controller 640 may move each of the tiled display panels DD1 to DDn in the third direction D3 by referring to distance data received from the sensor 620.

Figure 7:
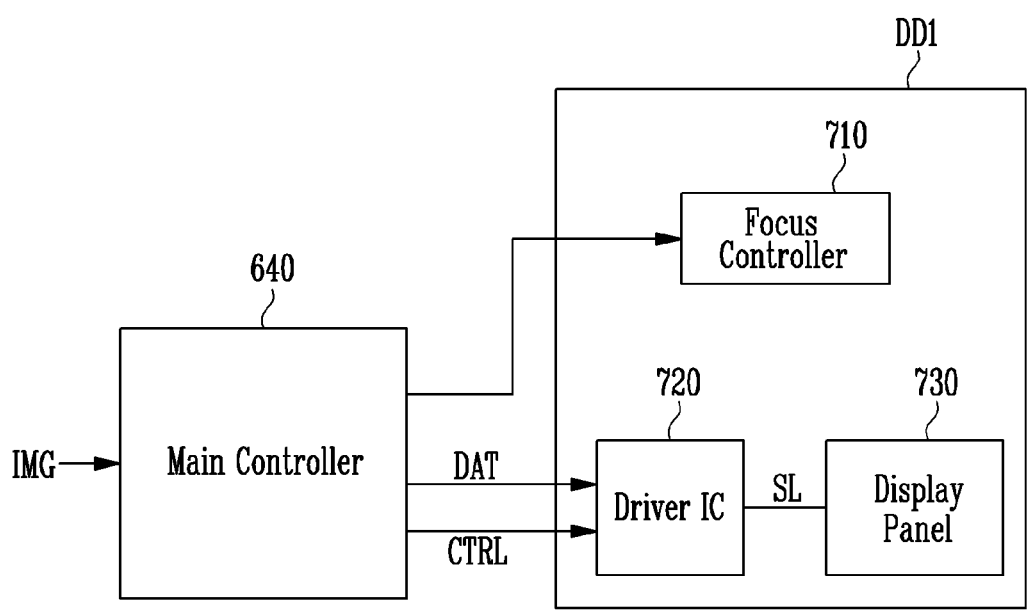
FIG. 7 is a block diagram illustrating an embodiment of a main controller and a first tiled display panel of FIG. 6.
Figure 8:
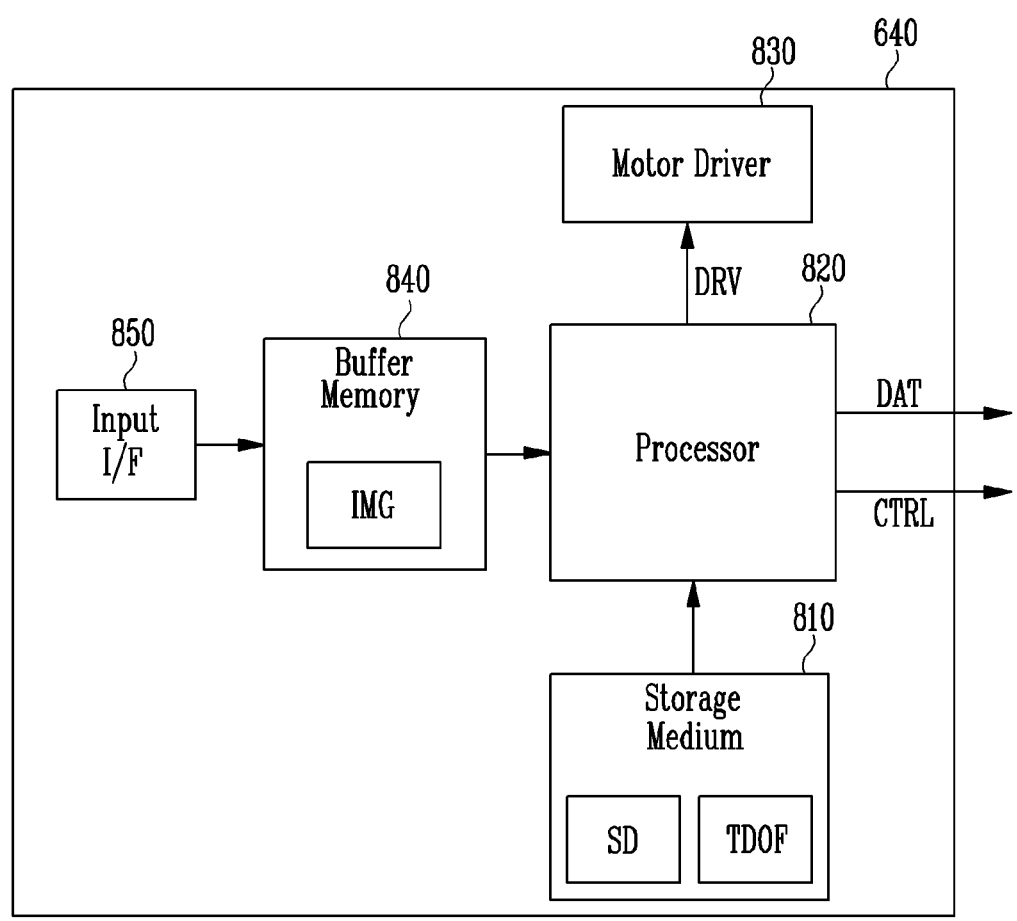
FIG. 8 is a block diagram illustrating an embodiment of the main controller of FIG. 7.

FIG. 7 is a block diagram illustrating an embodiment of the main controller and a first tiled display panel of FIG. 6, and FIG. 8 is a block diagram illustrating an embodiment of the main controller of FIG. 7.

First, referring to FIG. 7, the first tiled display panel DD1 may include a focus controller 710, a driver integrated circuit (IC) 720, and a display panel 730. In FIG. 7, the other tiled display panels DD2 to DDn are omitted, but second to n-th tiled display panels DD2 to DDn may be configured similarly to the first tiled display panel DD1. Hereinafter, an overlapping description is omitted.

The focus controller 710 may adjust the depth of field DOF of an image expressed by the first tiled display panel DD1. The main controller 640 receives the distance TD from the viewer 630 (detected by the sensor 620 of FIG. 6) and receives information indicative of a target depth of field TDOF (e.g., refer to FIG. 8) based on the received distance TD from the viewer 630, from an internal storage medium 810 (e.g., refer to FIG. 8). The main controller 640 may control the focus controller 710 to adjust the depth of field DOF of FIG. 6 based on the target depth of field TDOF. For example, the main controller 640 may control the focus controller 710 so that the depth of field DOF of the image matches the target depth of field TDOF. In embodiments, the focus controller 710 may adjust the depth of field DOF of FIG. 6 by controlling the liquid crystal layer LCL of the lens unit 220, as described with reference to FIGS. 4 and 5, in response to the control of the main controller 640. In addition, the focus controller 710 may adjust the depth of field DOF of the image to the target depth of field TDOF in real time according to various methods. The target depth of field TDOF may be a depth of field DOF in which the viewer 630 may view the image clearly. For example, the target depth of field TDOF may be experimentally determined for each distance TD from the viewer 630.

The driver IC 720 may be connected to the display panel 730. The driver IC 720 receives the data signal DAT and the control signal CTRL from the main controller 640. The driver IC 720 processes the data signal DAT in response to the control signal CTRL, and displays an image on the display panel 730 according to the processed data signal DAT. A plurality of signal lines SL may include data lines. The driver IC 720 may apply grayscale voltages corresponding to the data signal DAT to a plurality of data lines.

The display panel 730 is connected to the driver IC 720 through the plurality of signal lines SL. The display panel 730 includes the plurality of pixels PX described with reference to FIGS. 2 and 3. The plurality of pixels PX operate in response to control of the driver IC 720. The display panel 730 may include the display surface DS of FIG. 2. The display panel 730 may display the image according to the grayscale voltages applied through the data lines.

Referring to FIG. 8, the main controller 640 may include the storage medium 810, a processor 820, a motor driver 830, a buffer memory 840, and an input interface (input I/F) 850.

The storage medium 810 may store information indicative of a predetermined viewing distance SD corresponding to each reference distance. The storage medium 810 may store information indicative of one or more target depths of field TDOF. The storage medium 810 may include at least one of various types of storage media capable of maintaining stored data even though power is cut off, such as a register or a flash memory.

The processor 820 may control the movement members 610 to 61n of FIG. 6 based on the distance TD from the viewer. The processor 820 may identify a reference distance in the storage medium 810 that matches the distance TD from the viewer. The processor 820 may then obtain the viewing distance SD (e.g., see FIG. 10) corresponding to the identified reference distance from the storage medium 810. The processor 820 may control each of the movement members 610 to 61*n* according to the determined viewing distance SD.

The processor 820 is configured to read the image data IMG from the buffer memory 840, process the read image data IMG, and output the data signal DAT according to the processed image data IMG. The processor 820 may further output the control signal CTRL corresponding to the data signal DAT. The data signal DAT and the control signal CTRL may be transmitted to the first tiled display panel DD1 as described, for example, with reference to FIG. 7.

The processor 820 may detect an object included in the image data IMG received from the buffer memory 840. The processor 820 may independently control each of the movement members 610 to 61*n* according to the detected object, so that the viewer may view an image with a well-expressed three-dimensional effect according to an object of an expressed image.

The motor driver 830 may receive a driving signal DRV from the processor 820. The motor driver 830 may move the tiled display panels DD1 to DDn by driving each of the movement members 610 to 61*n* based on the driving signal DRV.

The buffer memory 840 is configured to temporarily store the image data IMG. The buffer memory 840 may include at least one of various memories such as a dynamic random access memory (DRAM) and/or a static random access memory (SRAM).

The input interface 850 is configured to receive the image data IMG from an external device (e.g., host) and store the received image data IMG in the buffer memory 840.

Figure 9:
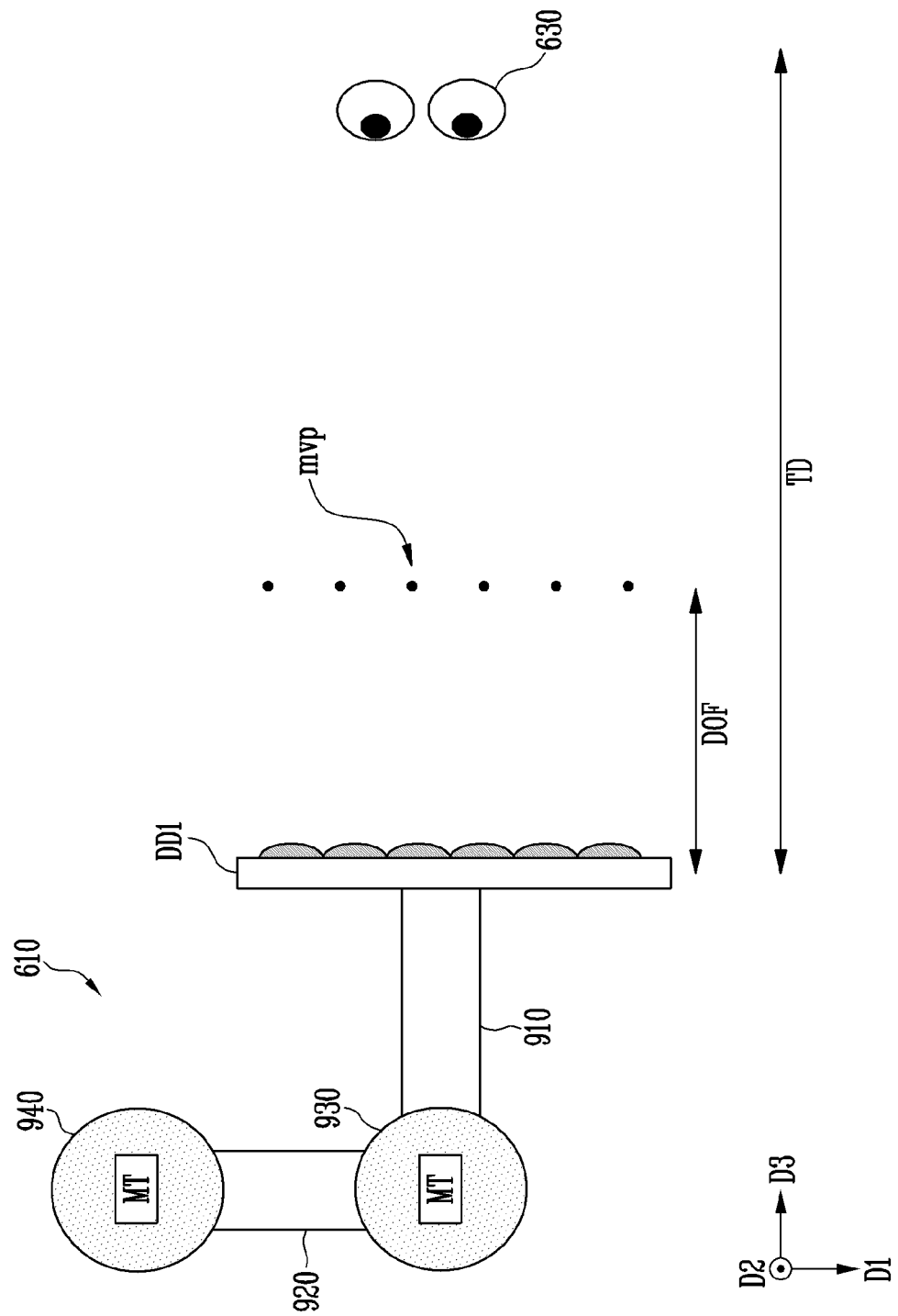
FIG. 9 is a side view illustrating an embodiment of a movement member and a tiled display panel.

FIG. 9 is a side view illustrating an embodiment of one of the movement members and a corresponding one of the tiled display panels DD1.

Referring to FIG. 9, a first movement member 610 may include a first support portion 910, a second support portion 920, a first joint portion 930, a second joint portion 940, and a number of motors MT.

The first movement member 610 may be connected to the first tiled display panel DD1. In embodiments, the first movement member 610 may be fixed to a support member (such as the housing HS of FIG. 1) at one end thereof and may be connected to the first tiled display panel DD1 at another end thereof. In embodiments, the first movement member 610 may be implemented as a robot arm that operates as a position adjuster and connects the first tiled display panel DD1 to the supporting member, such as the housing HS. In embodiments, the first movement member 610 may move (e.g., adjust the position of) the first tiled display panel DD1. In FIG. 9, the other tiled display panels DD2 to DDn are omitted, but each of the second to n-th tiled display panels DD2 to DDn may also be connected to a corresponding movement member similarly to the first tiled display panel DD1. Hereinafter, an overlapping description is omitted.

The first support portion 910 may be positioned between the first tiled display panel DD1 and the first joint portion 930. The first support portion 910 may support the first tiled display panel DD1.

In embodiments, the first support portion 910 may be rotatably connected to one side of the first joint portion 930. The first support portion 910 may be rotated about an axis parallel to the second direction D2 by the first joint portion 930. For example, the first support portion 910 may be rotated by rotational force generated from the motor MT in the first joint portion 930. In embodiments, when the first joint portion 930 rotates, the second joint portion 940 may also rotate, simultaneously or in succession, so that a display surface of the first tiled display panel DD1 faces the third direction D3, as shown, for example, in FIG. 10. In one embodiment, the first tiled display panel DD1 may also rotate by the rotation of the first joint portion 930. For example, the sensor 620 of FIG. 6 may detect the viewing height and/or the viewing position of the viewer 630. Based on the detected viewing height and/or the viewing position, a direction in which the display surface of the first tiled display panel DD1 faces may be rotated about an axis parallel to the second direction D2. Through this, an image adaptive to the viewing height and/or the viewing position of the viewer 630 may be provided.

The second support portion 920 may be positioned between the first joint portion 930 and the second joint portion 940. In embodiments, the second support portion 920 may be rotatably connected to each of the first joint portion 930 and the second joint portion 940. The second support portion 920 may be rotated about an axis parallel to the second direction D2 by the second joint portion 940. For example, the second support portion 920 may be rotated about the second joint portion 940 by rotational force generated from the motor MT in the second joint portion 940. In addition, the second support portion 920 may be rotated about the first joint portion 930. Through this, the first supporter 910 and the second supporter 920 may move the first tiled display panel DD1 in a direction parallel to the third direction D3. Accordingly, the distance TD between the first tiled display panel DD1 and the viewer 630 may change, e.g., be reduced to a viewing distance SD, e.g., see FIG. 10.

The first joint portion 930 and the second joint portion 940 may be rotatably connected to the first support portion 910 and the second support portion 920, and thus may guide rotation of the first support portion 910 and the second support portion 920 to adjust the position of the first tiled display panel DD1.

The motors MT may be included in the first joint portion 930 and the second joint portion 940. The motors MT may operate in response to control of the main controller 640. The motors MT may convert power provided from a power source into rotational force, and thus may rotate the first support portion 910 and the second support portion 920.

Figure 10:
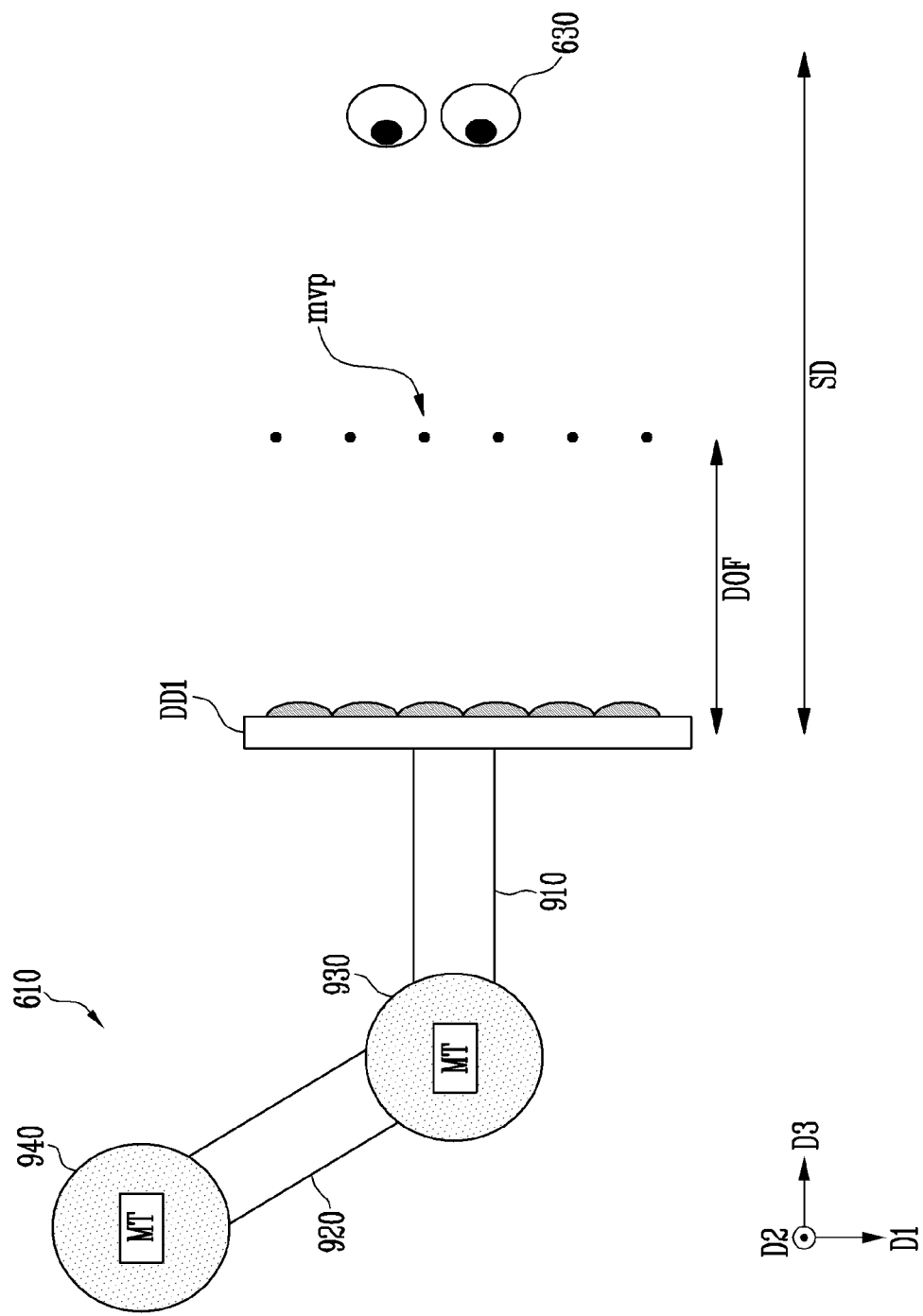
FIG. 10 is a side view illustrating a state in which the tiled display panel of FIG. 9 is moved in a third direction by the movement member according to an embodiment.

FIG. 10 is a side view illustrating a state in which the tiled display panel of FIG. 9 is moved in the third direction by the movement member according to an embodiment.

Referring to FIG. 10, the first movement member 610 may move the first tiled display panel DD1 in a direction parallel to the third direction D3 through rotation of the first support portion 910 and the second support portion 920. For example, the first movement member 610 may change (e.g., reduce) the distance TD from the viewer 630 to the viewing distance SD determined by the processor 820, e.g., SD<TD. Through this, the viewer 630 may be provided with a three-dimensional image having an improved three-dimensional effect.

As described above, the first movement member 610 may move the first tiled display panel DD1 in the direction parallel to the third direction D3 through rotation of the first support portion 910 and the second support portion 920, so that the first tiled display panel DD1 is close to or farther away from the viewer 630. As previously indicated, the first movement member 610 and the second movement may operate as adjusters to adjust the position of the first tiled display panel DD1 to correspond to the viewing distance SD.

The first tiled display panel DD1 may have a specific depth of field DOF. In one embodiment, the first tiled display panel DD1 is moved in the third direction D3 to be closer to the viewer 630. In this case, the viewer 630 may be positioned relatively close to the depth of field DOF. For example, the maximum viewpoints mvp of the depth of field DOF may be positioned relatively close to the viewer 630. In another embodiment, the first tiled display panel DD1 may be moved to be farther away from the viewer 630, in order to generate an improved three-dimensional effect.

Figure 11:
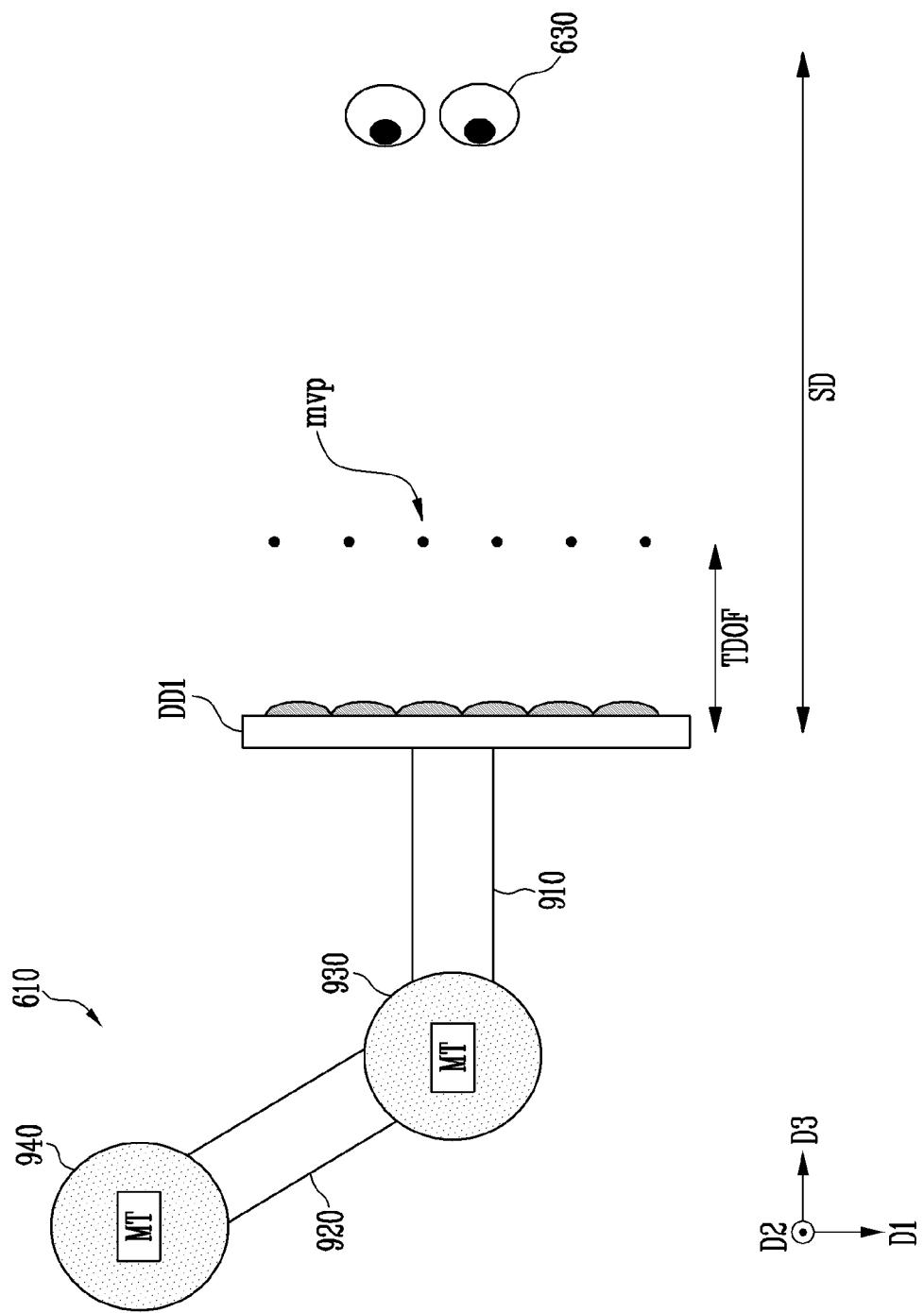
FIG. 11 is a side view illustrating an embodiment in which the tiled display panel of FIG. 10 adjusts a depth of field of an image.

FIG. 11 is a side view illustrating an embodiment in which the tiled display panel of FIG. 10 adjusts the DOF of the image.

Referring to FIG. 11, the depth of field DOF of the first tiled display panel DD1 may be changed to the target depth of field TDOF. As described with reference to FIG. 7, the focus controller 710 may change the depth of field DOF to the target depth of field TDOF. Based on this change, the viewer 630 may view a three-dimensional image having an improved three-dimensional effect.

Figure 12:
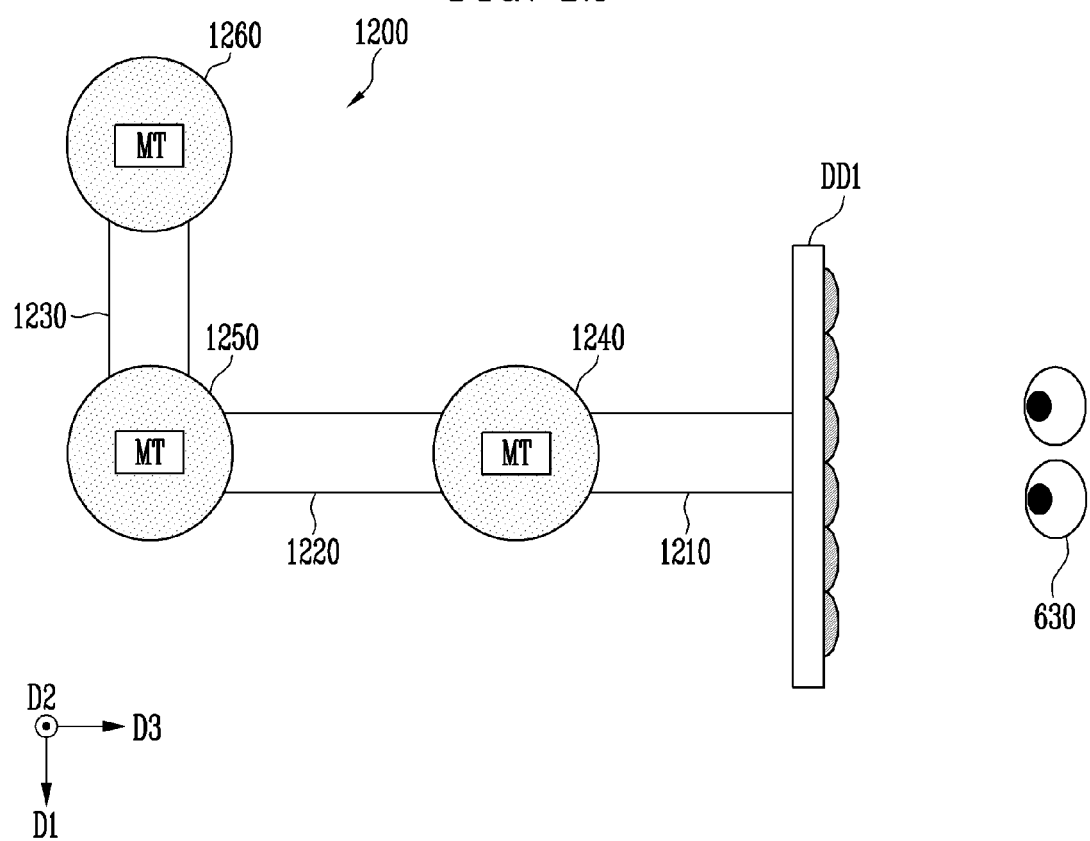
FIG. 12 is a side view illustrating an embodiment of the movement member.

FIG. 12 is a side view illustrating another embodiment of the first movement member (or adjuster).

Referring to FIG. 12, the first movement member 1200 may include a first support portion 1210, a second support portion 1220, a third support portion 1230, a first joint portion 1240, a second joint portion 1250, a third joint portion 1260, and a number of motors MT.

The second support portion 1220, the third support portion 1230, the second joint portion 1250, and the third joint portion 1260 are configured similarly to the first support portion 910, the second support portion 920, the first joint portion 930, and the second joint portion 940 of FIG. 9, respectively. An overlapping description is omitted below.

The first support portion 1210 connects the first tiled display panel DD1 to the second support portion 1220. The first support portion 1210 is connected to the second support portion 1220 through the first joint portion 1240.

The first support portion 1210 may be rotatably combined with, or connected to, the first joint portion 1240. The first joint portion 1240 may guide rotation of the first support portion 1210, and the motor MT of the first joint portion 1240 may rotate the first support portion 1210. The first joint portion 1240 may include a motor MT and may rotate about an axis of a direction different from that of the second joint portion 1250 and the third joint portion 1260. This is described in more detail with reference to FIG. 13.

Figure 13:
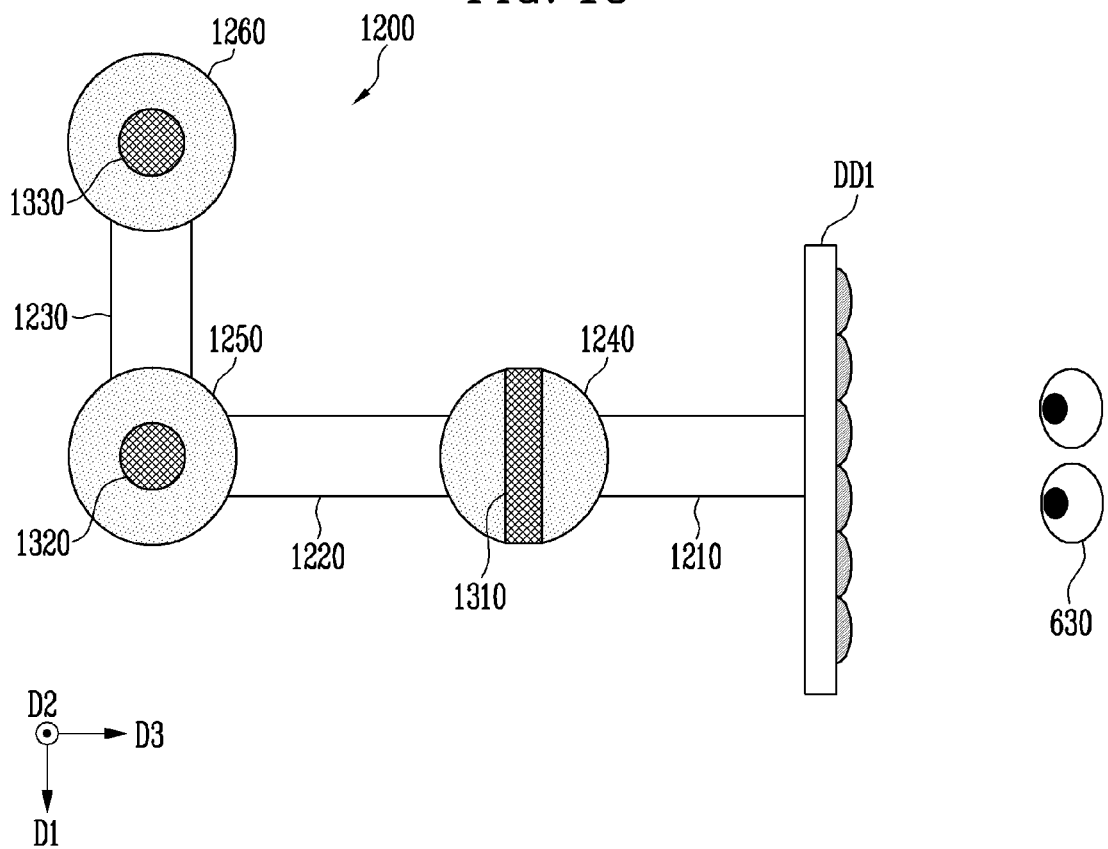
FIG. 13 is a side view illustrating directions of rotational shafts of the movement member of FIG. 12 according to an embodiment.

FIG. 13 is a side view illustrating directions of rotational shafts of the movement member of FIG. 12 according to an embodiment.

Referring to FIG. 13, a first rotation shaft 1310 may be included in the first joint portion 1240. The first rotation shaft 1310 may extend parallel to the first direction D1. The first rotation shaft 1310 may rotate the first support 1210 about an axis parallel to the first direction D1. This may allow for movement of the first tiled display panel DD1 in a direction different from movement imparted to the first tiled display panel DD1 provided by joint portions 1250 and 1260.

A second rotation shaft 1320 may be included in the second joint portion 1250. The second rotation shaft 1320 may extend parallel to the second direction D2. The second rotation shaft 1320 may rotate the second support portion 1220 about an axis corresponding to the second direction D2.

A third rotation shaft 1330 may be included in the third joint portion 1260. The third rotation shaft 1330 may extend parallel to the second direction D2. The third rotation shaft 1330 may rotate the third support 1230 about an axis corresponding to the second direction D2.

Figure 14:
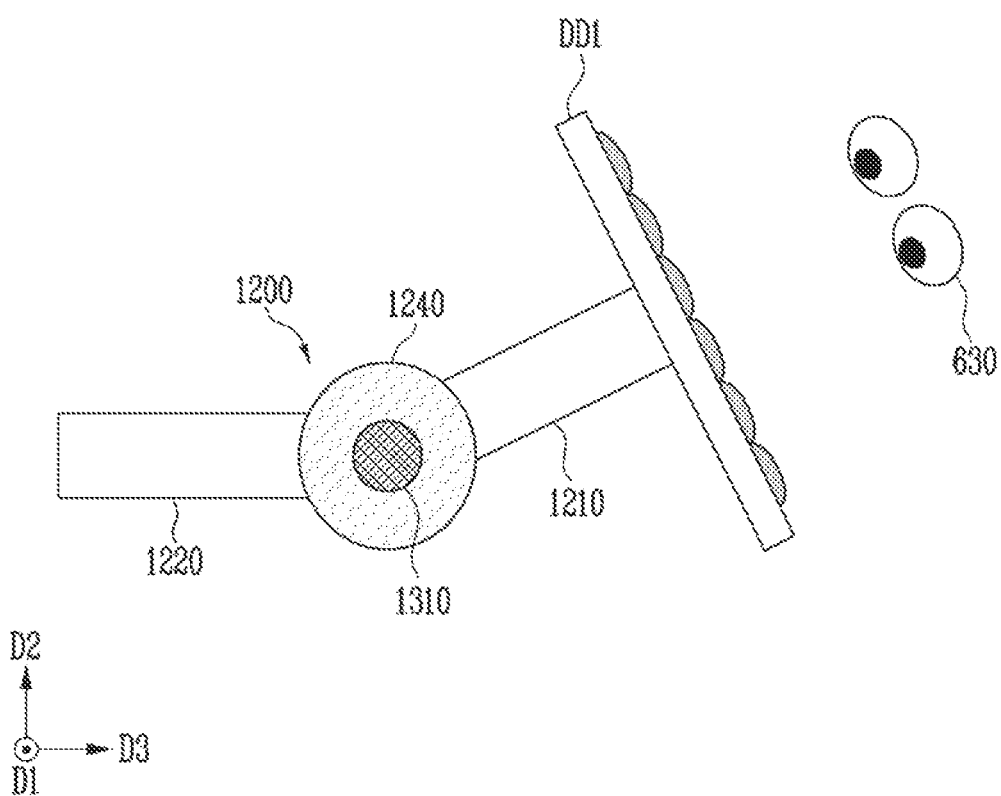
FIGS. 14 and 15 are plan views illustrating the tiled display panel rotated counterclockwise and clockwise based on a first direction by the movement member of FIG. 12 according to an embodiment.
Figure 15:
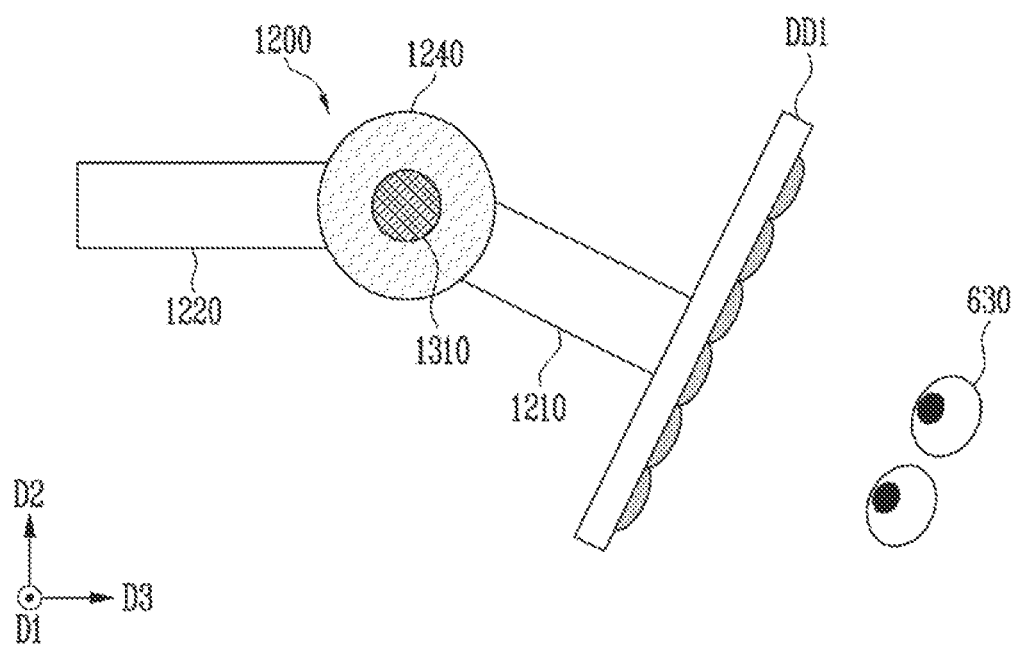

FIGS. 14 and 15 are plan views illustrating the tiled display panel rotated counterclockwise (FIG. 14) and clockwise (FIG. 15) based on the first direction by the movement member of FIG. 12.

Referring to FIG. 14, the first support portion 1210 may rotate counterclockwise based on the first direction D1. Referring to FIG. 15, the first support portion 1210 may rotate clockwise based on the first direction D1. As described above, the first rotation shaft 1310 may rotate a direction in which the first tiled display panel DD1 is facing based on an axis parallel to the first direction D1. Through this, the first tiled display panel DD1 may provide a stereoscopic image to the viewer 630 having a changed position.

Figure 16:
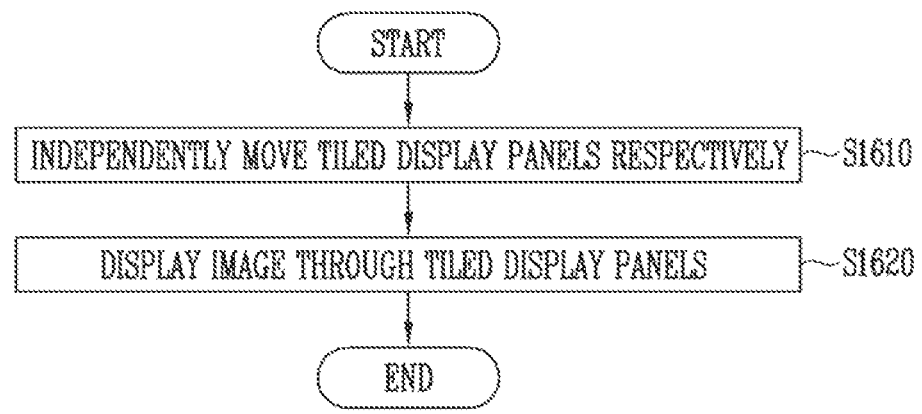
FIG. 16 is a flowchart illustrating operations included in a method of operating a tiled display device according to an embodiment of the disclosure.

FIG. 16 is a flowchart illustrating a method of operating a tiled display device according to an embodiment of the disclosure.

Referring to FIGS. 6 and 16, in operation S1610, the main controller 640 may independently move the tiled display panels DD1 to DDn in the direction parallel to the third direction D3. For example, the main controller 640 may move the movement members (adjusters) 610 to 61n in the direction parallel to the third direction D3 based on the distance data received from the sensor 620. The main controller 640 may move each of the tiled display panels DD1 to DDn combined to the movement members 610 to 61n in the direction parallel to the third direction D3.

In operation S1620, the tiled display device TDD may display an image through the tiled display panels DD1 to DDn. The main controller 640 may generate the data signal DAT and the control signal CTRL. The generated data signal DAT and control signal CTRL may be transmitted to the tiled display panels DD1 to DDn. Each of the tiled display panels DD1 to DDn may display an image based on the received data signal DAT and control signal CTRL. A distance between the viewer 630 and the depth of field DOF may be adjusted according to a degree to which each of the tiled display panels DD1 to DDn is moved. Thus, the image visually recognized by the viewer 630 may be different. Accordingly, a three-dimensional effect of a three-dimensional image may be better expressed.

FIG. 17 is a flowchart illustrating an embodiment of operation S1610 of FIG. 16.

Referring to FIGS. 6 and 17, in operation S1710, the sensor 620 may detect the distance TD from the viewer 630. The sensor 620 may provide the detected distance TD from the viewer 630 to the main controller 640. In operation S1720, the main controller 640 may move the tiled display panels DD1 to DD4 based on the distance TD from the viewer 630. The distance TD from the viewer 630 may correspond to the horizontal distance between the viewer 630 and the tiled display panels DD1 to DD4.

FIG. 18 is a flowchart illustrating an embodiment of operation S1720 of FIG. 17.

Referring to FIGS. 8 and 18, in operation S1810, the processor 820 may identify the reference distance that matches the distance TD from the viewer 630 among the stored reference distances. The storage medium 810 may store the viewing distance SD corresponding to each reference distance.

In operation S1820, the processor 820 may determine the viewing distance SD corresponding to the identified reference distance among stored viewing distances.

In operation S1830, the processor 820 may move one or more of the tiled display panels DD1 to DDn according to the determined viewing distance SD. The determined viewing distance SD may be the horizontal distance between the viewer 630 and the tiled display panels DD1 to DD4 that is capable of producing an improved three-dimensional effect of an expressed image.

Figure 19:
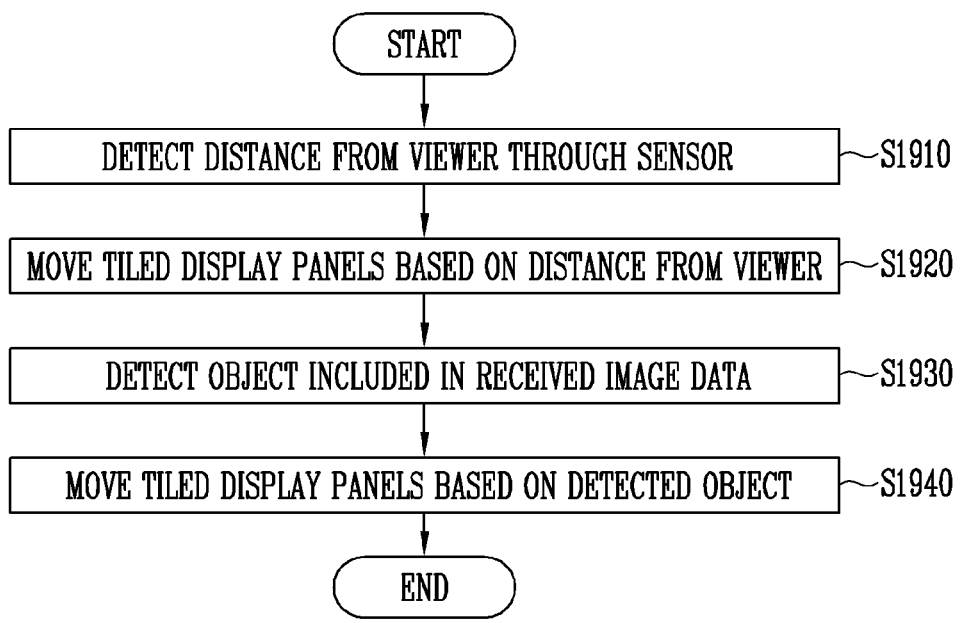
FIG. 19 is a flowchart illustrating an embodiment of operation S1610 of FIG. 16.

FIG. 19 is a flowchart illustrating another embodiment of operation S1610 of FIG. 16. The order of operations S1910 to S1940 shown in FIG. 19 is merely one example, and the order of operations S1910 to S1940 may be different in another embodiment.

Referring to FIGS. 6 and 19, in operation S1910, the sensor 620 may detect the distance TD from the viewer 630. The sensor 620 may provide a signal indicative of the detected distance TD from the viewer 630 to the main controller 640.

In operation S1920, the main controller 640 may move the tiled display panels DD1 to DDn based on the detected distance TD from the viewer 630.

In operation S1930, the main controller 640 may detect the object included in the image data IMG.

In operation S1940, the main controller 640 may move the tiled display panels DD1 to DDn based on the sensed object. For example, the main controller 640 may independently move all or a portion of the tiled display panels DD1 to DDn according to the position, shape, and/or another aspect of the object in the image. Through this operation, the tiled display device TDD may provide the viewer 630 with an image where the object is expressed with am improved three-dimensional effect.

Figure 20:
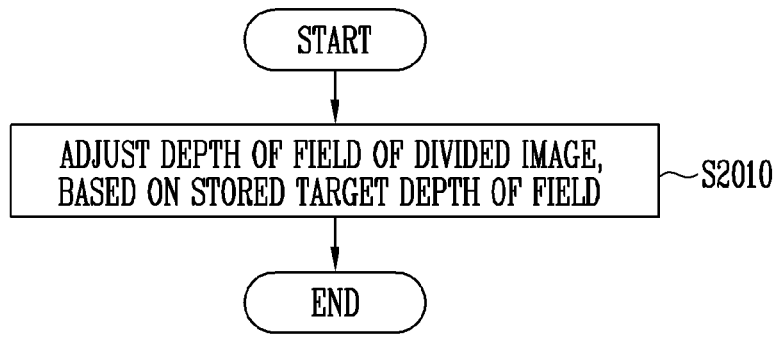
FIG. 20 is a flowchart illustrating an embodiment of operation S1620 of FIG. 16.

FIG. 20 is a flowchart illustrating an embodiment of operation S1620 of FIG. 16.

Referring to FIGS. 7, 8, and 20, the focus controller 710 may adjust the depth of field DOF of a divided image expressed by the tiled display panels DD1 to DDn in the third direction D3. For example, the focus controller 710 may change the depth of field DOF of the image to the stored target depth of field TDOF. The target depth of field TDOF may be the depth of field DOF in which the viewer 630 may view the image clearly. For example, the storage medium 810 may store information indicative of a plurality of target depths of field corresponding to respective viewing distances described with reference to operation S1810 of FIG. 18. The target depth of field TDOF may be a value stored in the storage medium 810 in association with the viewing distance SD determined in operation S1820 of FIG. 18. Accordingly, the tiled display device TDD may clearly provide a three-dimensional image to the viewer 630.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, units, drivers, and other signal generating and signal processing features of the embodiments disclosed herein may be implemented, for example, in non-transitory logic that may include hardware, software, or both. When implemented at least partially in hardware, the controllers, processors, units, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, units, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although specific embodiments and application examples are described herein, other embodiments and modifications may derive from the above description. Therefore, the spirit of the disclosure is not limited to these embodiments, and extends to the claims set forth below, various obvious modifications, and equivalents. The embodiments may be combined to form additional embodiments.

What is claimed is:

1. A tiled display device comprising:
   tiled display panels arranged in a first direction and a second direction crossing the first direction, each including a display configured to output a divided image and a lens array disposed on the display to refract the divided image;
   a sensor configured to detect a distance from a viewer, adjusters connected to the tiled display panels; and
   a processor configured to control the adjusters, wherein the adjusters are configured to independently move the tiled display panels in a third direction crossing the first and second directions, respectively, and wherein the processor is configured to control the adjusters to move the tiled display panels based on the distance from the viewer.

2. The tiled display device according to claim 1, further comprising: a storage medium configured to store information indicative of predetermined viewing distances that respectively correspond to reference distances, wherein the processor is configured to identify a reference distance that matches the distance from the viewer among the reference distances, determine a viewing distance corresponding to the identified reference distance among the predetermined viewing distances, and control the adjusters according to the determined viewing distance.

3. The tiled display device according to claim 2, further comprising:
a focus controller configured to adjust a depth of field of the divided image in the third direction,
wherein the storage medium stores information indicative of a target depth of field corresponding to the determined viewing distance, and
the focus controller is configured to control the depth of field of the divided image based on the stored information indicative of the target depth of field.

4. The tiled display device according to claim 1, wherein the processor is configured to:
generate a data signal so that the display of each of the tiled display panels outputs the divided image according to received image data.

5. The tiled display device according to claim 1, wherein the adjusters are connected to respective ones of the tiled display panels.

6. The tiled display device according to claim 1, wherein the adjusters include robot arms that move the tiled display panels.

7. The tiled display device according to claim 6, wherein each of the robot arms includes:
support portions connected to one of the tiled display panels, and
joint portions connected to the support portions to guide rotation of the support portions.

8. The tiled display device according to claim 7, wherein the joint portions include motors that rotate the support portions.

9. The tiled display device according to claim 7, wherein the joint portions comprise:
a first joint portion configured to guide rotation based on a rotation axis parallel to the first direction; and
a second joint portion configured to guide rotation based on a rotation axis parallel to the second direction.

10. The tiled display device according to claim 8, further comprising: a motor driver configured to provide power to the motors.

11. A method of controlling a display device including tiled display panels, wherein the tiled display panels are arranged in a first direction and a second direction crossing the first direction, each of the tiled display panels includes a display configured to output a divided image and a lens array disposed on the display to refract the divided image, the method comprising:
independently moving the tiled display panels in a third direction crossing the first and second directions, respectively; and
displaying an image through the tiled display panels after the tiled display panels are moved, wherein independently moving the tiled display panels comprises:
detecting a distance from a viewer through a sensor; and
moving the tiled display panels based on the distance from the viewer.

12. The method according to claim 11, wherein:
the display device further includes a storage medium configured to store information indicative of predetermined viewing distances that respectively correspond to reference distances, and
moving the tiled display panels based on the distance from the viewer comprises:
identifying a reference distance that matches the distance from the viewer among the reference distances;
determining a viewing distance corresponding to the identified reference distance among the predetermined viewing distances; and
moving the tiled display panels according to the determined viewing distance.

13. The method according to claim 12, wherein:
the storage medium stores information indicative of a target depth of field corresponding to the determined viewing distance, and
displaying the image through the tiled display panels comprises adjusting a depth of field of the divided image based on the stored information indicative of the target depth of field.

14. The method according to claim 11, wherein independently moving the tiled display panels comprises:
detecting an object included in received image data; and
moving the tiled display panels based on the detected object.

15. A method comprising:
detecting a distance between a tiled display panel and a viewer;
determining a viewing distance based on the distance between the tiled display panel and the viewer; and
adjusting a position of the tiled display panel to correspond to the viewing distance, wherein the adjusted position of the tiled display panel generates a three-dimensional representation of at least a portion of an image displayed on the tiled display panel.

16. The method of claim 15, wherein adjusting the position of the tiled display panel includes moving the tiled display panel closer to a position of the viewer.

17. The method of claim 15, wherein adjusting the position of the tiled display panel includes activating an adjuster provided for the tiled display panel.

18. The method of claim 15, further comprising:
detecting an object in at least the portion of the image; and
adjusting the position of the tiled display panel based on the detected object to improve the three-dimensional representation of the at least the portion of the image.

19. The method of claim 9, further comprising:
changing a depth of field of the tiled display panel to a target depth of field that corresponds to the distance between the tiled display panel and the viewer.

* * * * *